(12) United States Patent
Newberg et al.

(10) Patent No.: US 6,839,337 B2
(45) Date of Patent: Jan. 4, 2005

(54) BINDING PROXY FOR MOBILE DEVICES IN A DATA NETWORK

(75) Inventors: Donald G. Newberg, Hoffman Estates, IL (US); Michael F. Korus, Hoffman Estates, IL (US); Bradley M. Hiben, Glen Ellyn, IL (US)

(73) Assignee: Motorola, Inc., Schaumburg, IL (US)

( * ) Notice: Subject to any disclaimer, the term of this patent is extended or adjusted under 35 U.S.C. 154(b) by 32 days.

(21) Appl. No.: 10/013,291

(22) Filed: Dec. 10, 2001

(65) Prior Publication Data

US 2003/0108014 A1 Jun. 12, 2003

(51) Int. Cl.[7] .......................... H04Q 7/24; H04L 12/28

(52) U.S. Cl. ........................ 370/338; 370/352; 370/401

(58) Field of Search ................................ 370/338, 331, 370/392, 332, 351, 352, 313, 330, 401, 443, 409; 455/422, 432, 433, 435, 452

(56) References Cited

U.S. PATENT DOCUMENTS

| | | | | |
|---|---|---|---|---|
| 6,115,390 A | * | 9/2000 | Chuah | 370/443 |
| 6,144,671 A | * | 11/2000 | Perinpanathan et al. | 370/409 |
| 6,256,300 B1 | * | 7/2001 | Ahmed et al. | 370/331 |
| 6,327,254 B1 | * | 12/2001 | Chuah | 370/328 |
| 6,526,033 B1 | * | 2/2003 | Wang et al. | 370/338 |

* cited by examiner

*Primary Examiner*—Ajit Patel
*Assistant Examiner*—Yvonne Q Ha
(74) *Attorney, Agent, or Firm*—Terri S. Hughes; Latonia H. Gordon; Indira Saladi

(57) ABSTRACT

Binding proxies are used to reduce packet routing delays and call setup delays in a data network made up of a plurality of subnetworks. The binding proxy detects when a mobile device connects to a subnetwork and sends a binding message to various correspondent device(s) in the data network. The binding message contains a care-of-address of the mobile device that allowing the correspondent device(s) to send messages directly to the subnetwork that the mobile device is connected, thereby bypassing a home agent of the mobile device.

18 Claims, 4 Drawing Sheets

BINDING PROXY FOR MOBILE DEVICES IN A DATA NETWORK

FIELD OF THE INVENTION

This invention relates generally to data networks, and more particularly, to data networks with mobile devices.

BACKGROUND OF THE INVENTION

Data networks with mobile devices are well known. In such data networks, mobile devices such as laptop computers can be attached at any point in the network. In the case of data networks employing the well-known Internet Protocol (IP), data is subdivided into packets which are routed in the network using IP addresses that are related to the topology of the network. Each device in the network is assigned one or more IP addresses. The IP addresses are partially determined by what portion of the network the device is connected to. This presents a problem for mobile devices since they may be connected anywhere in the network. Generally, mobile devices retain the same "home" IP address regardless of where they are presently connected in the network. However, when the device is away from its home network, it will be unable to receive packets addressed to the home address unless those packets are forwarded to a care-of-address associated with the device's present location. The device may also receive packets sent directly to a care of address. The care of address is defined by a protocol known as mobile IP protocol (or "Mobile IP"). Presently, there are two different versions of mobile IP, version 4 ("MIPv4") and version 6 ("MIPv6").

There is shown in FIG. 1 a data network 100 that employs Mobile IP to facilitate the mobility of mobile devices. The data network 100 is composed of a number of interconnected subnetworks 103–106. In the data network 100, data is transmitted in packets between a number of devices 130–138 via routers 116–120. The routers 116–120 direct the data packets to the proper subnetwork 103–106 of the data network 100 so that they reach the proper destination device. A mobile device 134 is shown attached to the data network 100. Although the mobile device 134 is shown attached to the subnetwork 104, it should be understood that it may be moved to any location within the data network 100. The data network 100 also contains a call control entity 138. The call control entity 138 manages calls between different devices in the data network 100. These calls may be similar to telephone calls or they may be multimedia sessions such as streaming video or audio, video conferences, game sessions etc.

In one embodiment, the data network 100 employs MIPv4 to route data packets to the mobile device 134. Alternatively, the data network 100 employs MIPv6 to route data packets to the mobile device 134. Under either MIPv4 or MIPv6, every mobile device is assigned a home agent on a home network. In FIG. 1, a home agent 130 for the mobile device 134 is shown attached to the subnetwork 103, which is a home subnetwork for the mobile device 134. All subnetworks that are not the home subnetwork of the mobile device 134 are referred to as foreign subnetworks. In MIPv4, each foreign network is assigned a foreign agent. In FIG. 1, a foreign agent 139 is shown attached to subnetwork 104, which is a foreign subnetwork of the mobile device 134. The mobile device 134 has an IP address (i.e., "home" address) that corresponds to the home network 103. When a device in the data network 100 sends a data packet to the mobile device 134 that is addressed to the home address, the data packet is directed by the routers 116–120 to the home network 103 of the mobile device 134. If the mobile device 134 is not attached to the home subnetwork 103, packets addressed to the home address are intercepted by the home agent and forwarded to the foreign agent 139 on the subnetwork 104. The foreign agent 139 then passes the data packet to the mobile device 134. Using this process, the mobile device is able to keep the same IP address as it moves about the data network 100 even through the IP address corresponds to a location on the home subnetwork 103.

In the embodiment where the data network 100 employs MIPv6, there are no foreign agents. Upon receiving packets addressed to the mobile device's home address, the home agent 130 sends the data packets destined for the mobile device 134 directly to the mobile device 134. In addition, MIPv6 provides for the mobile device receiving a care of address when it is away from its home network. Packets that are addressed to the care of address are routed directly to the mobile device 134 instead of having to be intercepted by the home agent 130 and forwarded. Packets are typically sent as part of a "session," or series of packets exchanged between devices. A session may represent, for example, a download of a webpage, a multi-media call, or an FTP session. When a session is set up, the sending device typically does not know that the mobile device has moved from its home address, so the first packets of the session are sent to the mobile device's home IP address, intercepted by the home agent and forwarded to the mobile device. The mobile device 134 may then inform the sending device of its care of address, so that the sending device may send data packets directly to the mobile device 134.

The call control entity 138 manages the setup of calls between devices in the data network 100. Setting up a call establishes a session between two or more mobile or fixed devices so that they may exchange messages such as, for example, voice, video, data or gaming media. This requires that the call control entity 138 be able to signal the devices in order to invite them into the call. It also requires that communication resources can be allocated to carry the media.

One problem that arises when setting up calls involving mobile devices is that excessive time delays may result when messages are routed to the mobile device 134 by way of the home agent 130. The time delay can be particularly problematic in large networks where the mobile device 134 may be a long distance from the home agent. This problem is most significant in MIPv4, because all data packets from the call control entity 138 to the mobile device 134 are sent to the home agent 130 first. In MIPv6, typically only the first data packet(s) of a session between the call control entity 138 to the mobile device 134 are sent to the home agent 130. However, this still results in a delay in the call setup.

A second problem arises when an attempt is made to allocate the communication resources in a data system that employs Mobile IP. Mobility protocols provide location transparency that hides the actual location of the devices, preventing the call control entity 138 from determining which resources the mobile devices require.

Therefore, there is a need for a method of decreasing the setup time required for calls made in a data network containing mobile devices. There is further a need for informing a call control entity of the data network of the location of mobile devices, so that it is able to determine which resources the mobile devices require. This invention is directed to satisfying or at least partially satisfying these needs.

BRIEF DESCRIPTION OF THE DRAWINGS

The foregoing and other advantages of the invention will become apparent upon reading the following detailed description and upon reference to the drawings in which.

DESCRIPTION OF A PREFERRED EMBODIMENT

The present invention is directed to an apparatus and method for reducing time delays required to deliver messages to mobile devices in a data network. Traditionally, the delivery of messages to a mobile device away from its home network has been facilitated by a home agent tracking the subnetwork to which the mobile device is connected. Upon receiving packets addressed to the mobile device, the home agent forwards messages to the mobile device by way of a foreign agent (in MIPv4) or by tunneling the packets to the mobile devices care of address (in MIPv6). The present invention adds a binding proxy to the subnetworks. The binding proxy detects when a mobile device connects to the subnetwork and sends a binding message to those devices in the data network that need to quickly contact the mobile device. The binding message contains information allowing the devices to send messages directly to the subnetwork that the mobile device is connected to, thereby bypassing the home agent and reducing packet delays, hence reducing call setup time.

Figure 1:
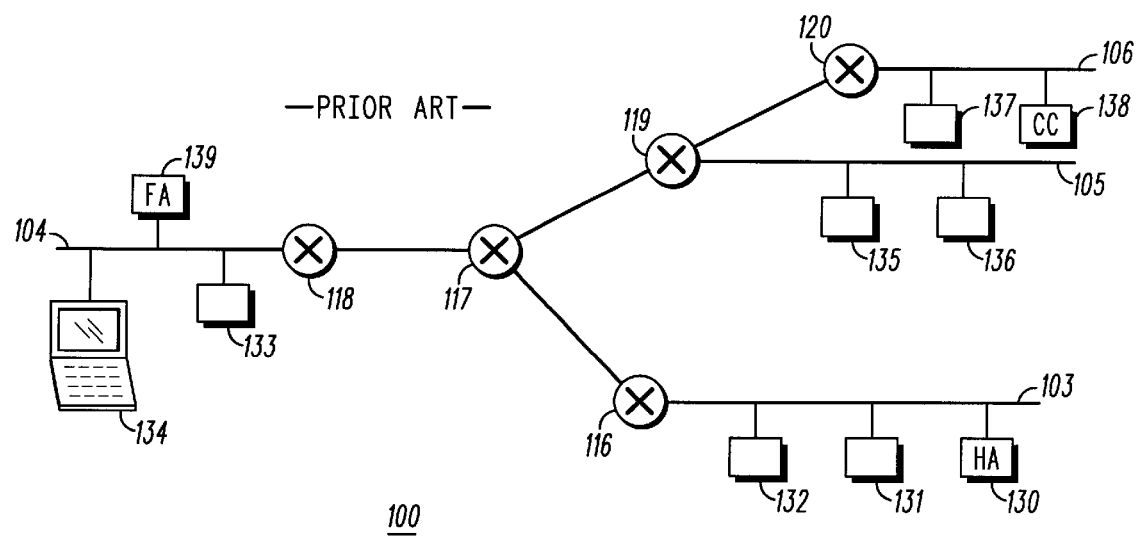
FIG. 1 is a diagram of a data network that employs the Mobile IP protocol to facilitate the mobility of mobile devices according to the prior art.
Figure 2:
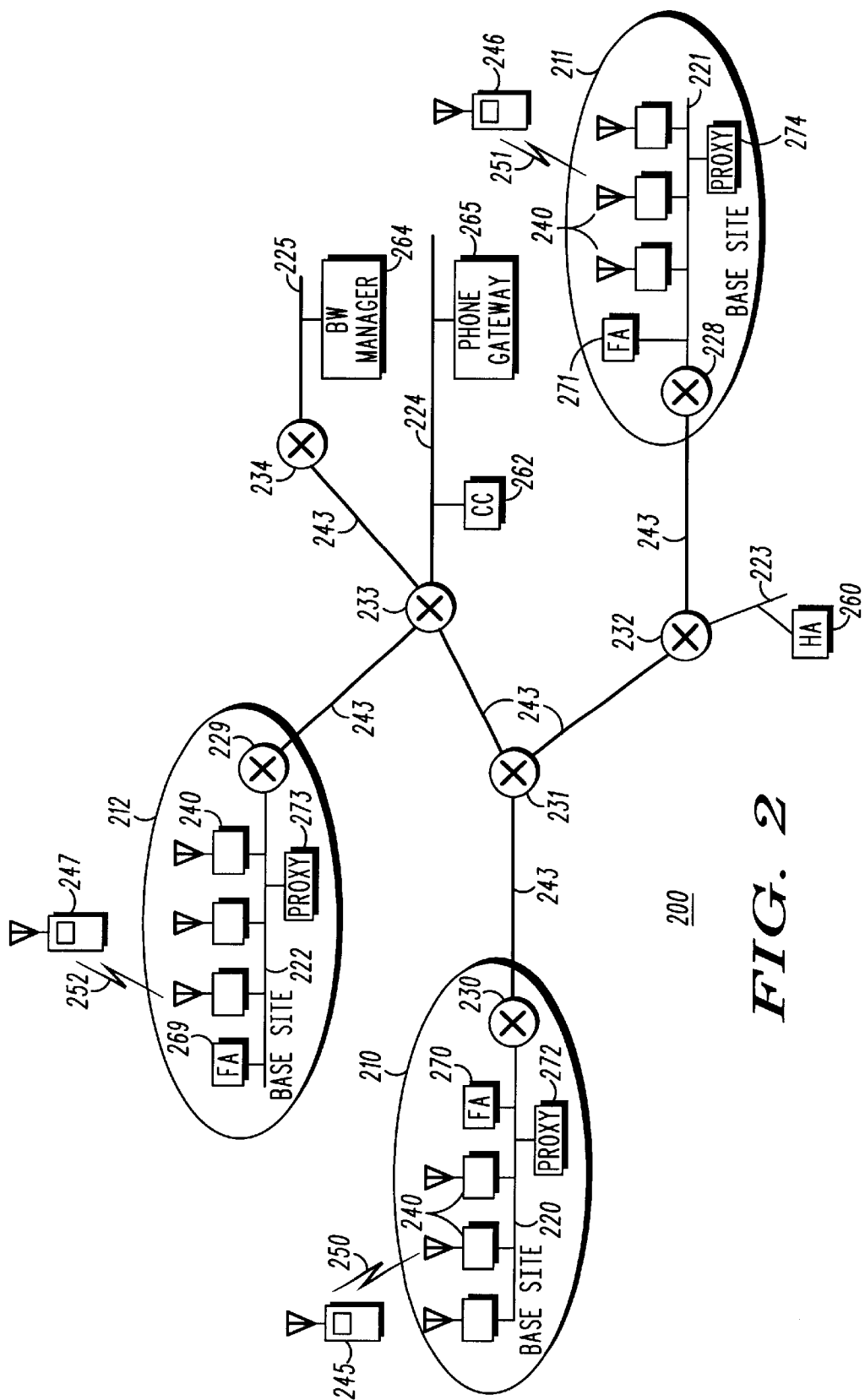
FIG. 2 shows a wireless communication system embodying principles of the present invention.

Turning now to FIG. 2, there is shown a wireless communication system 200 embodying the present invention. The wireless communication system 200 provides communication services to mobile devices 245–247 over communication resources 250–252. The wireless communication system 200 comprises a plurality of basesites 210–212 and subnetworks 223–225 interconnected by site links 243 and routers 231–234. The communication services provided to the mobile devices 245–247 can include, for example, telephone service, dispatch service, electronic mail, paging service, electronic commerce, location service and packet data service.

In one embodiment, the mobile devices 245–247 comprise wireless radio terminals that are equipped for 2-way communication of voice and data. The mobile devices 245–247 may be capable of transmitting and receiving voice communication such as required for telephone communication or dispatch service. The mobile devices 245–247 may also be equipped for sending and receiving IP datagrams (or packets) associated with multimedia calls (e.g., voice, data or video, including but not limited to high-speed streaming voice and video) and data transfers singly or simultaneously with other devices in the wireless communication system 200. As will be appreciated, in general the mobile devices 245–247 may comprise virtually any mobile or portable wireless radio devices, cellular radio/telephones, devices having varying capacities to accommodate multimedia calls, video terminals, portable computers with wireless modems, or any other wireless devices.

The base sites 210–212 include a plurality of base stations 240 that are coupled via subnetworks 220–222 to a router 228–230. The subnetworks 220–222 may be local area networks (LANs) such as, for example, Ethernet, Token Ring, or any other commercial or proprietary LAN technology. The base stations 240 at the various basesites 210–212 communicate, via wireless communication resources 250–252 with the mobile devices 245–247. As will be appreciated, the wireless communication resources 250–252 may comprise any of the currently available resources, such as, for example, radio frequency (RF) technologies, including, but not limited to Code Division Multiple Access (CDMA), Time Division Multiple Access (TDMA), Frequency Division Multiple Access (FDMA), and the like. Moreover, the invention of the present application may be used in any of the currently available Radio Frequency (RF) communication systems, such as, for example, Global System for Mobile communication (GSM), General Packet Radio Service (GPRS), Universal Mobile Telecommunications Service (UMTS), Trans-European Trunked Radio service (TETRA), Association of Public Safety Communication Officers (APCO) Project 25, Personal Communication Service (PCS), Advanced Mobile Phone Service (AMPS) and the like. In the alternative, other wireless technologies, such as those now known or later to be developed and including, but not limited to, infrared, third generation (3G) cellular systems, Bluetooth, electric field, electromagnetic, or electrostatic transmissions, may offer suitable substitutes.

As shown, the base sites 210–212 also contain foreign agents 269–271. In general, the foreign agents 269–271 may be any computing device that is configured to help manage the delivery of data to the mobile devices 245–247 as they move around the network. In one embodiment, there is one foreign agent 269–271 at each of the basesites 210–212. In another embodiment of the present invention, the basesites 210–212 do not contain the foreign agents 269–271. Each of the basesites 210–212 also contains a binding proxy 272–274. The binding proxies 272–274 can be any general purpose computing devices that are configured to help with the registration of the mobile devices 245–247 as they 10 move around the wireless communication network 200. The function of the binding proxies 272–274 will be described in more detail in relation to FIG. 3 and FIG. 7. Although the foreign agents 269–271 and binding proxies 272–274 are shown as stand alone entities, it will be appreciated that they may be combined with other devices at the basesites 210–212 such as, for example, the base stations 240 and the routers 228–230. Although only one binding proxy 272–274 is shown at each of the base sites 210–212, it will be further appreciated that more than one binding proxy may be present.

Generally, the routers 231–234 comprise specialized or general purpose computing devices configured to receive data packets from a particular device in the wireless communication system 200 and relay the data packets to other router(s) or device(s) in the wireless communication system 200. The routers connect the base sites 210–212 and subnetworks 223–225 together via the use of the site links 243. The routers direct data among the different devices of the wireless communication network 200. The site links 243 connect the routers 228–234. The site links 243 may be fiber optic cables, T1 lines, E1 lines, coaxial cable, fixed point-to-point radio links, Ethernet cables or other suitable means for providing data links between the various routers 228–234 of the wireless communication system 200.

The subnetworks 223–225 connect various devices to the wireless communication network 200. The subnetworks 223–225 may be local area networks (LAN) such as, for example, Ethernet, Token Ring, fiber distributed data interconnect (FDDI) or asynchronous transfer mode (ATM) or any other commercial or proprietary LAN technology. The various devices that may be connected to the subnetworks 223–225 include, for example, a home agent 260, a call control entity 262, a bandwidth manager 264 and a phone gateway 265. By way of example and not by way of limitation, other devices connected to the subnetworks 223–225 may include paging gateways, electronic commerce servers, packet data gateways and game servers. All these devices may be referred to using the generic term "server" since they provide some service to other devices in the wireless communication network. All of the subnetworks 220–225 and routers 228–234 of the wireless communication system 200 together make up a data network for the routing of data packets between devices such as, for example, servers and mobile devices.

The phone gateway 265 connects the wireless communication network to the public switched telephone network (PSTN) (not shown). The phone gateway allows telephone conversations to take place between the mobile devices 245–247 and telephones connected to the PSTN. For voice traveling from the PSTN to the mobile devices 245–247, the phone gateway 265 converts the voice signal to a digital waveform, divides the digital waveform into packets and then sends the packets to the mobile devices 245–247. For the voice traveling from the mobile devices 245–247 to the PSTN, the phone gateway 265 converts the packets of data received from the mobile devices 245–247 to a voice waveform that can be sent to the PSTN.

The home agent 260 may be any general purpose computing device. The home agent assists with the routing of data to the mobile devices 245–247 as they move around the wireless communication network 200. The functions of the home agent will be described in more detail below.

The call control entity 262 manages the set up of calls between devices in the wireless communication network 200. These calls include not only conventional telephone calls but also may include, for example, multimedia calls that contain any combination of voice, data and video, streaming video, streaming audio, game sessions, and dispatch calls between multiple devices. The call control entity may accomplish the set up of calls using any call control protocols such as the Session Initiation Protocol (SIP) or H323. SIP is a protocol adopted by the Internet Engineering Task Force for establishment of multimedia calls in an IP network. H323 is a protocol adopted by the International Telecommunications Union for the establishment of calls in an IP network. It should be noted that larger wireless communication networks 200 could contain multiple call control entities 262.

The bandwidth manager 264 manages access to the communication resources 250–252. Each of the basesites 210–212 has a limited number of communication resources 250–252 over which communication services can be provided. The bandwidth manager 264 receives request(s) from the mobile devices 245–247 for access to the communication resources 250–252 or request(s) from other devices such as the call control entity 262 that desire to provide services to the mobile devices 245–247. The bandwidth manager 264 assigns access to the communication resources 250–252 responsive to the request(s). The assignment may require the mobile devices 245–247 to connect to a different base stations 240 at the same basesite 210–212. The bandwidth manager 264 makes the assignment of communication resources in such a way as to avoid conflicts between the mobile devices 245–247. It should be noted that in larger wireless communication networks 200, more than one bandwidth manger 264 could be present.

Practitioners skilled in the art will appreciate that the wireless communication system 200 may include various other entities not specifically shown in FIG. 2. For example, the wireless communication system 200 may contain a link such as, for example a T1 line or E1 digital carrier system that connects the routers 231–234 or subnetworks 223–225 to a paging network or short message system via a paging gateway, and a facsimile machine or similar device via a fax gateway or modem. Futhermore, the wireless communication system 200 may include any number or type of wire line communication device(s), site controller(s), comparator(s), telephone interconnect device(s), internet protocol telephony device(s), call logger(s), scanner(s) and gateways, collectively referred to herein as a fixed communication device(s) or simply fixed devices. Generally, such fixed communication devices may be either sources or recipients of data packets routed through the wireless communication system 200.

As will be further appreciated, many variations of the wireless communication system 200 of FIG. 2 are possible. Any number of base sites may be present in the wireless communication system 200. Each base site may contain a different number of base stations or may contain other equipment such as base site controllers. The wireless communication system 200 may be divided into a plurality of zones with each zone having its own controller. Multiple call control entities and bandwidth managers may be present. Greater or fewer numbers of routers may be present in the wireless communication system 200. The configuration of routers and other devices in wireless communication system 200 may be different. Additional types of gateways may be present at the wireless communication system 200 such as, for example, fax gateways, paging gateways, electronic mail gateways or electronic commerce gateways. The gateways may be present in the wireless communication system 200 at any place. The wireless communication system 200 may include one or more simulcast sites. Simulcast sites simultaneously broadcast identical signals to mobile devices from several different base stations. This can improve the reliability of communication to the mobile devices. The wireless communication system 200 may also contain dispatch sites. The dispatch sites contain dispatch consoles that may be used to communicate with the mobile devices from a fixed location. The wireless communication system 200 may not contain the phone gateway 265, bandwidth manager 264, and/or call control entity 262. Many other variations of the wireless communication system 200 are possible without departing from the spirit and scope of the present invention.

In the preferred embodiment, Internet Protocol (IP) is used to route data through the wireless communication network 200. Every device in the wireless communication network 200 is assigned at least one IP address. The data to be transported through the network is split into packets and attached to a header that contains the IP address of the source and destination of the data. The IP address contains two parts: a network prefix that corresponds to a subnetwork that the device is connected to and a host section that corresponds to the individual devices connected to the subnetwork. The fact that the IP addresses specify a subnetwork that the device is attached to presents a problem for mobile devices since mobile devices may move between subnetworks. Because of this, the IP address of a mobile device can only be used to deliver data to the device when it is on the subnetwork to which the IP address corresponds.

In the preferred embodiment, Mobile IP is used to deliver packets of data to the mobile devices 245–247. Each mobile device 245–247 is assigned a home subnetwork, which is the subnetwork to which the network prefix portion of the mobile device's 245–247 IP address corresponds. All data packets sent to the mobile device's 245–247 IP address are therefore routed to this subnetwork. The home network of a mobile device must contain the home agent 260 of the mobile device 245–247. The home agent 260 accepts data packets destined for the mobile device 245–247 whenever the mobile device 245–247 is not connected to its home subnetwork. The home agent 260 keeps track of the location of the mobile device 245–247 as it travels through the wireless communication system 200 and forwards the accepted packets to the mobile device 245–247 when it is not connected to its home subnetwork. All subnetworks that are not the home subnetwork of the mobile device 245–247 are referred to as foreign subnetworks of the mobile device 245–247.

In the case where the network uses MIPv4, each foreign subnetwork to which any of the mobile devices 245–247 can connect contains a foreign agent 269–271. When a mobile device 245–247 first connects to the base station 240 of the foreign subnetwork, the mobile device 245–247 sends a registration message to the foreign agent 269–271. The foreign agent 269–271 assigns the mobile device 245–247 a care-of-address that can be used by the mobile device 245–247 while it is connected to the foreign subnetwork. The foreign agent 269–271 also sends a binding message to the home agent 260 of the mobile device 245–247. The binding message contains the address of the mobile device 245–247 and the care-of-address being used by the mobile device 245–247. When the home agent 260 forwards data packets to the mobile device 245–247, it uses the care-of-address to direct the data packets to the foreign agent 269–271. The foreign agent 269–271 then delivers the data packets to the mobile device 245–247.

As an example of the use of MIPv4 in the wireless communication system 200, consider a mobile device 245 connected to a foreign subnetwork 220. The mobile device 245 uses the home agent 260 connected to the home subnetwork 223. When data packets are sent to the mobile device 245 from another device in the wireless communication system 200, the data packets are routed to the home subnetwork 223. The home agent 260 receives the data packets and forwards them to the foreign agent 270 on the foreign subnetwork 220 using the care-of-address of the mobile device 245. The foreign agent receives the forwarded packets and delivers them to the base station 240 that the mobile device is connected to. The base station transmits the data packets to the mobile device 245 using the communication resource 250.

In the case where the wireless communication system 200 uses MIPv6, there are no foreign agents. When the mobile device 245–247 first connects to a new foreign subnetwork, it picks a care-of-address that contains a subnetwork portion that is appropriate for the foreign subnetwork. The mobile device 245–247 then sends a binding message to the home agent 260. The binding message contains the address of the mobile device 245–247 and the care-of-address being used by the mobile device 245–247 while it is attached to the foreign subnetwork. When the home agent 260 forwards data packets to the mobile device 245–247, it uses the care-of-address to direct the data packets directly to the mobile device 245–247.

As an example of the use of MIPv6 in the wireless communication system 200, again consider the mobile device 245 connected to the foreign subnetwork 220. When data packets are sent to the mobile device 245 from another device in the wireless communication system 200, the data packets are routed to the home subnetwork 223, where they are intercepted by the home agent 260 and forwarded to the mobile device 245 using the care-of-address of the mobile device 245. The forwarded data packets are routed to the base station 240 that the mobile device is connected to. The base station transmits the data packets to the mobile device 245 using the communication resource 250.

According to principles of the present invention, binding proxies are used to reduce packet routing delays and call setup delays relative to the prior art. It is noted, for example, that call set up times are adversely affected by any communication delays occurring between the call control entity 262 and the mobile devices 245–247, as well as by any delays occurring between the bandwidth manager 264 and mobile devices 245–247 and the base stations 240 they are connected to in order to allocate the communication resources 250–252 among the mobile devices 245–247. If the call control entity 262 or bandwidth manager 264 had to rely on the home agent 260 to route communication to the mobile devices 245–247, as in the prior art, the call setup and resource allocation functions would be delayed. The bandwidth manager 264 also needs to know the identity of the base stations 240 serving each of the mobile devices 245–247. The home agent is not able to supply this information since it just receives the address and care-of-address of the mobile devices 245–247.

The binding proxies 272–274 provide a means for devices in the wireless communication system 200 to learn of the care-of-address and locations of the mobile devices 245–247 as they travel around the wireless communication network 200 without having to interact with the home agent 260. This is accomplished without modifying the mobile devices 245–247, home agent 260 or foreign agents 270. The binding proxies 272–274 are operable to detect when a mobile device 245–247 first connects to a base station 240 at one of the basesites 210–212. The binding proxy then sends a binding message to certain correspondent devices notifying them of the care-of-address of the mobile device 245–247. The correspondent devices may comprise, for example, any server such as the call control entity 262 or the bandwidth manager 264. The correspondent devices can then use the care-of-address to send messages directly to the mobile device 245–247 or the foreign agent 270 of the mobile device 245–247 without having to route the message through the home agent 260. The binding message may also include a base station identifier. The base station identifier can be used to specify a particular base station within the wireless communication system 200. The base station identifier may either be unique within the wireless communication system 200 or just within a particular base site. If it is unique only within a particular base site, the base station identifier may be used along with care-of-address to uniquely specify a particular base station 240. This is possible because the subnetwork portion of the care-of-address corresponds to the subnetwork to which the base station 240 that the mobile device 245–247 is connected to is connected. It will be appreciated that the binding proxy may be adapted to notify any device in the wireless communication system 200 when a mobile device 245–247 connects to a base station 240.

Figure 3:
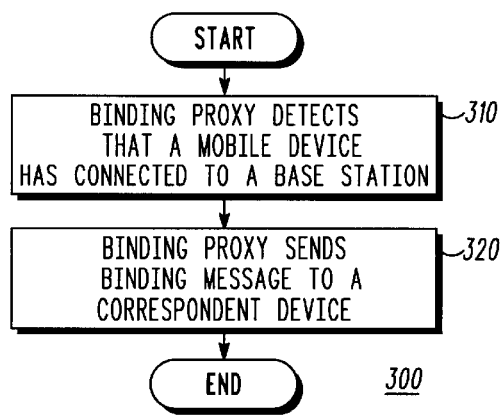
FIG. 3 is a flowchart illustrating a method for a binding proxy to notify a correspondent device of the movement of a mobile device in a wireless communication system according to the present invention.

FIG. 3 is a flowchart illustrating a method for a binding proxy to notify a correspondent device of the movement of a mobile device in a wireless communication system. The correspondent device may comprise a call control entity, bandwidth manager or generally any device that is corresponding (or will prospectively correspond) with the mobile device including but not limited to controllers, web servers, electronic commerce servers, encryption/security servers, dispatch controllers or paging gateways. The notification by the binding proxy will enable communication to be established quickly between the correspondent device and the mobile device without routing of messages to a home agent or other forwarding device.

At step 310, the binding proxy detects that the mobile device has connected to a base station. The binding proxy may accomplish the detection by a number of different methods. For example, if the mobile device (or a foreign agent for the mobile device) sends a binding message to a home agent, the binding proxy could intercept the binding message. If the binding proxy is located within the base station, the radio frequency (RF) signaling between the mobile device and the base station when the mobile device first connects to the base station would provide notice to the binding proxy. If the binding proxy is located separately from the base station, the base station may be adapted to send a message to the binding proxy when the mobile device connects to it.

At step 320, the binding proxy then sends a binding message to the correspondent device. The binding message includes the care-of-address of the mobile device, which care-of-address is usable to send messages to the mobile device (or, in the case of MIPv4, to the mobile device's foreign agent) while the mobile device is operably connected to the base station. The binding message may also include the home IP address of the mobile device and/or a base station identifier that corresponds to the base station to which the mobile device has connected.

Figure 4:
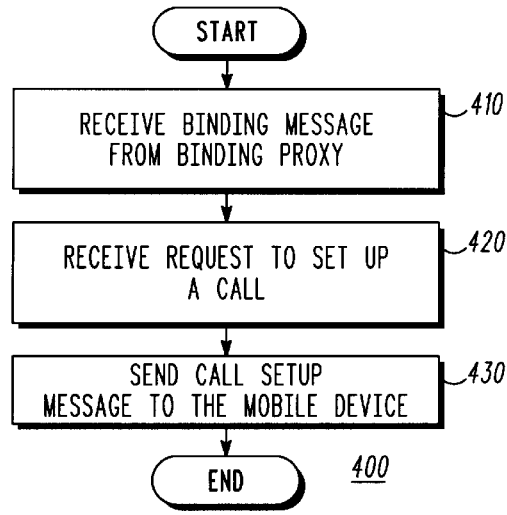
FIG. 4 is a flowchart illustrating a method for a call control entity to set up a call to a mobile device in a wireless communication system according to the present invention.

FIG. 4 is a flowchart illustrating a method for a call control entity to set up a call to a mobile device in a wireless communication system. At step 410, the call control entity receives a binding message from the binding proxy. The binding message contains the care-of-address of the mobile device, thereby allowing the call control entity to send messages directly to the mobile device or the mobile device's foreign agent. As has been described in relation to FIG. 3, the binding message may also include the home address of the mobile device and/or a base station identifier that corresponds to the base station to which the mobile device is connected.

Some time later, at step 420, the call control entity receives a request to set up a call that involves the mobile device. This request can come from any other device that is a part of or connected to the wireless communication system, such as for example, another mobile device, a phone gateway, a game server, a paging gateway, an electronic commerce server, a web server, a streaming audio or video source, or a multimedia content source. Responsive to the request, at step 430, the call control entity sends a call setup message to the mobile device. The call setup message is addressed to the care-of-address so that it is routed directly to the mobile device, thereby bypassing the home agent of the mobile device.

Figure 5:
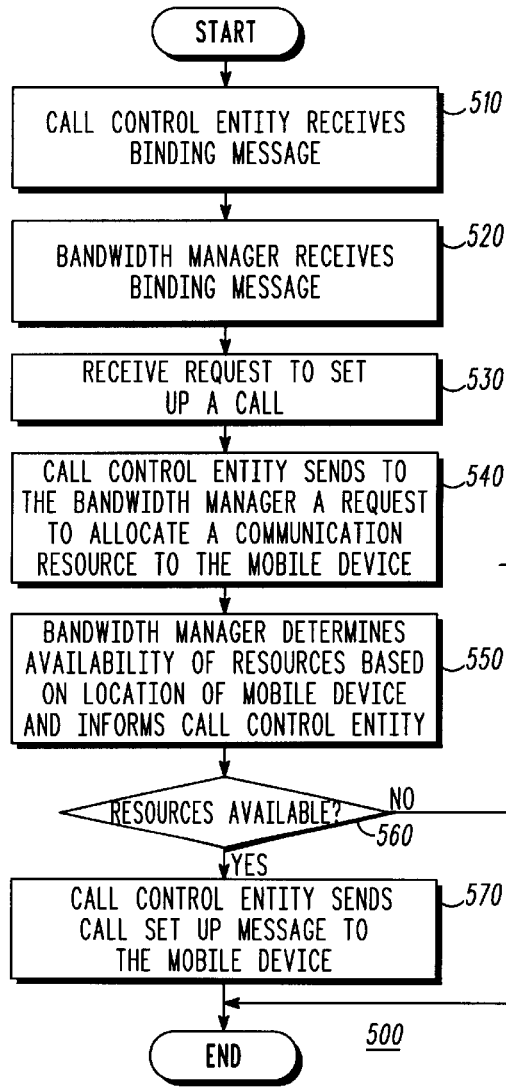
FIG. 5 is a flowchart illustrating another method for setting up a call to a mobile device in a wireless communication system according to the present invention.

FIG. 5 is a flowchart illustrating another method for setting up a call to a mobile device in a wireless communication system. At step 510, the call control entity receives a binding message from the binding proxy; and at step 520, a bandwidth manager operable to assign resources for the call receives a binding message from the binding proxy. As has been described in relation to FIG. 3 and FIG. 4, the binding message contains a care-of-address of the mobile device and may further contain a home IP address and/or base station identifier that corresponds to the base station to which the mobile device is connected. The binding message may be sent to the bandwidth manager at step 520 before, after, or coincident with the binding message sent to the call control entity at step 510.

Some time later, at step 530, the call control entity receives a request to set up a call that involves the mobile device. This request can come from any other device that is a part of or connected to the wireless communication system, such as for example, another mobile device, a phone gateway, a game server, a paging gateway, an electronic commerce server, a web server, a streaming audio or video source, or a multimedia content source. Responsive to the request, at step 540, the call control entity sends a request to the bandwidth manger to allocate a communication resource to the mobile device for the call. At step 550, the bandwidth manager determines an availability of resources based on the location of the mobile device and informs the call control entity of such availability. Thus, for example, with reference to FIG. 2, if the mobile device 245 (site 210) is requested to participate in the call, the bandwidth manager 264 determines an availability of communication resources at site 210 and informs the call control entity 262 accordingly.

If the call control entity is informed that resources are available, determined at step 560, the call control entity sends at step 570 a call setup message to the mobile device. The call setup message is addressed to the care-of-address so that it is routed directly to the mobile device, thereby bypassing the home agent of the mobile device. Conversely, if the call control entity is informed that resources are not available, the call control entity may deny or busy the call request and the process ends, substantially as known in the art.

Figure 6:
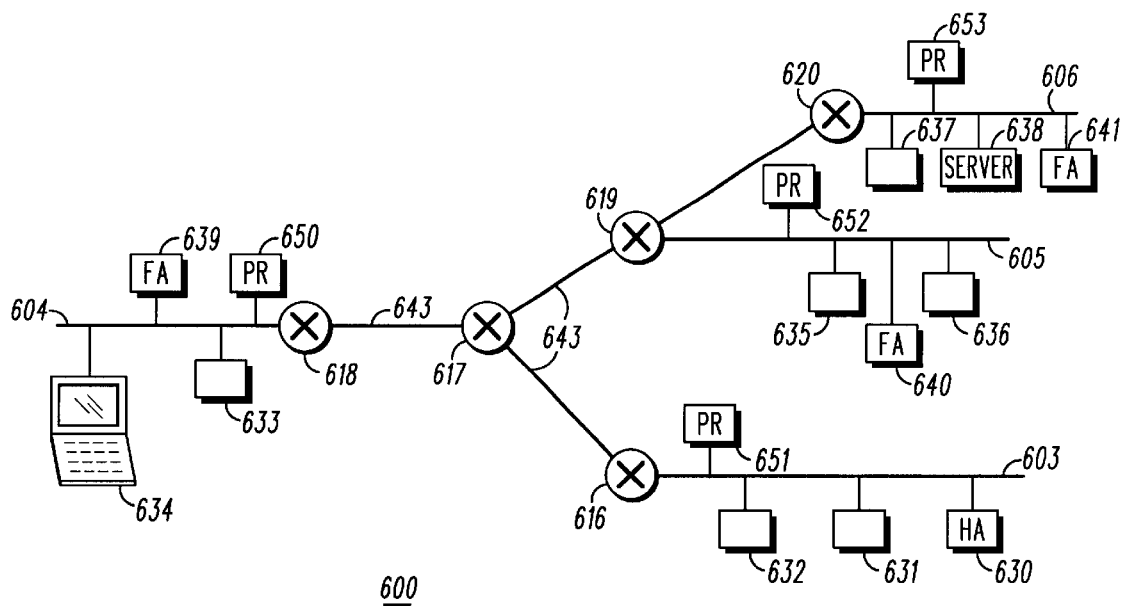
FIG. 6 shows a data network 600 embodying principles of the present invention.

In addition to being useful in wireless communication systems, the present invention may also be utilized in connection with any data network. FIG. 6 shows a data network 600 that utilizes the present invention. The data network comprises a plurality of subnetworks 603–606 connected by a number of routers 616–620 and data links 643. Connected to each subnetwork 603–606 is a plurality of devices 630–637 a binding proxy 650–653 and a foreign agent 639–641. In addition, some of the subnetworks 603–606 also contain a home agent 630 and a server 638.

In general, the subnetworks 603–606 may be any LAN technology such as, for example, Ethernet, token ring, fiber distributed data interconnect (FDDI) or asynchronous transfer mode (ATM). The subnetworks 603–606 provide a data connection between the devices 630–637, binding proxies 650–653, foreign agents 639–641, home agent 630, and server 638 connected to the subnetworks 616–620 and the routers 616–620 of the data network 600. The routers 616–620 may be any commercially available routers. The data links 643 may be fiber optic cables, T1 lines, E1 lines, coaxial cable, fixed point-to-point radio links, Ethernet cables or other suitable means for providing a link between the various routers 616–620. The devices 630–637 may be any devices requiring data communication such as, for example, computers, printers, telephones, appliances, fax machines, etc. One or more of the devices 630–637 is a mobile device. The mobile device may be any device that is capable of being moved from one part of the data network 600 to another such as, for example, laptop computers or palm computers.

The home agent 630 may be any general purpose computing device. The home agent assist with the routing of data to the mobile devices as they move around the data network 600. The functions of the home agent are the same as described above with regard to the wireless communication system 200 of FIG. 2. In general, the foreign agents 639–641 may be any computing device that is configured to help manage the delivery of data to the mobile devices as they move around the network. The functions of the foreign agents 639–641 are the same as described above with regard to the wireless communication system 200 of FIG. 2. In one embodiment of the present invention, there is one foreign agent 639–641 on each of the subnetworks 603–606. In another embodiment of the present invention, there are no foreign agents 639–641 in the data network 600.

The server 638 may be any device that provides services to the other devices of the data network 600. The server may be, for example, a web server, an electronic commerce server, a game server, a paging gateway, a telephone gateway or a call control entity. For simplicity, only one server is shown in FIG. 6, but it should be understood that in general any number of servers might be present. If the server is a call control entity, it will manage the set up of calls between devices in the data network 600. These calls include not only conventional telephone calls but also may include, for example, multimedia calls that contain any combination of voice, data and video, streaming video, streaming audio, game sessions, and dispatch calls between multiple devices. The call control entity may accomplish the set up of calls using any call control protocols such as the Session Initiation Protocol (SIP) or H323. SIP is a protocol adopted by the Internet Engineering Task Force for establishment of calls up multimedia calls in an IP network. H323 is a protocol adopted by the International Telecommunications Union for the establishment of calls in an IP network. It should be noted that larger data networks 600 could contain multiple call control entities.

In one embodiment, the data network 600 employs IP to deliver data packets among the plurality of devices 630–637, binding proxies 650–653, foreign agents 639–641, home agent 630, and server 638, and Mobile IP to direct data packets to mobile devices as described above with regard to the wireless communication system 200 of FIG. 2. In one embodiment, the data network 600 employs MIPv4 to deliver data packets to mobile devices. In another embodiment, the data network 600 employs MIPv6 to deliver data packets to mobile devices. The functioning of MIPv4 and MIPv6 and the home agent 630 and foreign agents 639–641 is the same as described above with regard to the wireless communication system 200 of FIG. 2. It should be noted that since MIPv6 does not require foreign agents, in embodiments of the data network 600 employing MIPv6, no foreign agents will be present.

As will be appreciated, many variations of the wireless communication system 600 of FIG. 6 are possible. For example, any number of subnetworks, routers and devices (mobile and stationary) may be present in the data network 600. The data network 600 may contain more than one home agent or server. The data network 600 may contain wireless subnetworks such as, for example, wireless LANs.

Figure 7:
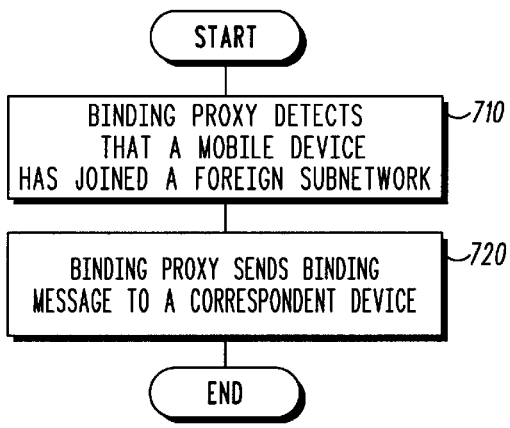
FIG. 7 is a flowchart illustrating a method for a binding proxy to notify a correspondent device of the movement of a mobile device in a data network according to the present invention.

FIG. 7 is a flowchart illustrating a method for a binding proxy to notify a correspondent device of the movement of a mobile device in a data network. The correspondent device may comprise a call control entity, bandwidth manager or generally any device that is corresponding (or will prospectively correspond) with the mobile device including but not limited to controllers, web servers, electronic commerce servers, encryption/security servers, dispatch controllers or paging gateways. The notification by the binding proxy will enable communication to be established quickly between the correspondent device and the mobile device without routing of messages to a home agent or other forwarding device.

At step 710, the binding proxy detects that the mobile device has operably connected to a foreign subnetwork. The binding proxy may accomplish the detection by a number of different methods. For example, if the mobile device or a foreign agent for the mobile device sends a binding message to a home agent, such as done in Mobile IP, the binding proxy could intercept the binding message. At step 720, the binding proxy then sends a binding message to the correspondent device. The binding message includes the care-of-address of the mobile device, which care-of-address is usable to send messages to the mobile device (or, in the case of MIPv4, to the mobile device's foreign agent) while the mobile device is at the foreign subnetwork. The binding message may also include the home IP address of the mobile device.

Figure 8:
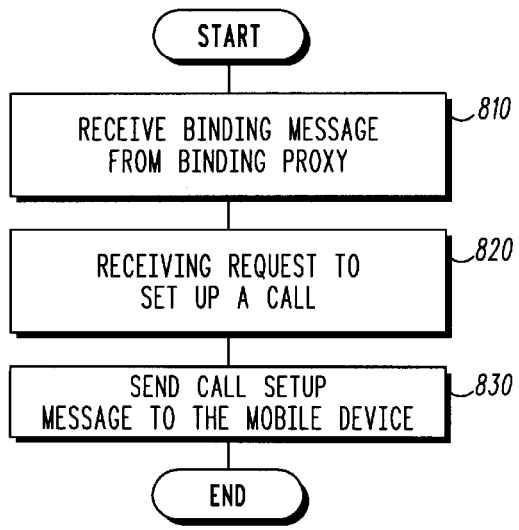
FIG. 8 is a flowchart illustrating a method for a call control entity to set up a call to a mobile device in a wireless communication system according to the present invention.

FIG. 8 is a flowchart illustrating a method for a call control entity to set up a call to a mobile device in a wireless communication system. At step 810, the call control entity receives a binding message from the binding proxy. As has been described in relation to FIG. 7, the binding message includes a care-of-address of the mobile device and may further include the home address of the mobile device.

At step 820, the call control entity receives a request to set up a call that involves the mobile device. This request can come from any other device that is a part of or connected to the data network. Responsive to the request to set up a call, at step 830, the call control entity sends a call setup message to the mobile device. The call setup message contains the care-of-address of the mobile device so that it can be routed directly to the mobile device. The call setup message does not have to be routed to the home agent of the mobile device.

It is desirable to be able to connect any mobile device to a data network or wireless communication system without modification. One advantage of using a binding proxy is that quick establishment of communication can be enabled without any modification to the mobile device. For example, if the mobile device is capable of supporting IP and Mobile IP, the device simply functions as it normally would when using Mobile IP, but it receives the advantage of quicker communication setup. Likewise, since no change is made in the functioning of IP or Mobile IP, any home agent or foreign agent can be used in the wireless communication system or data network without modification.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for providing mobility in a data network comprising a plurality of subnetworks, the method comprising the steps of:
   monitoring, by a binding proxy, traffic from a mobile device joined to a foreign subnetwork:
   detecting, by the binding proxy, that a first binding message is being sent to a home agent of the mobile device;
   and;
   sending, by the binding proxy, a second binding message to a correspondent device allowing the correspondent device to send messages directly to the foreign subnetwork that the mobile device is joined to, thereby bypassing the home agent.

2. The method of claim 1 wherein the second binding message includes a care-of-address for sending data directly to the mobile device while joined to the foreign subnetwork.

3. The method of claim 2 wherein the second binding message further includes a home address of the mobile device on the home subnetwork.

4. The method of claim 2 wherein the correspondent device is a call control entity, the method further comprising the steps of:
   receiving, by the call control entity, a request to set up a call between the mobile device and one or more other devices within the data network;
   sending, by the call control entity, a call set up message addressed to the care-of-address of the mobile device.

5. The method of claim 1 wherein the data network comprises a wireless communication network operable to provide wireless communication services for the mobile device via wireless communication resources, and wherein the correspondent device is a bandwidth manager that manages allocation of bandwidth on the wireless communication resources.

6. In a wireless communication system comprising a plurality of base stations connected by a data network, the data network comprising a plurality of subnetworks, the base stations providing communication services to mobile devices using communication resources, a method comprising the steps of:
   receiving, by a binding proxy, an indication from a base station that a mobile device has operably connected to the base station of the plurality of base stations;
   and
   sending, by the binding proxy, a binding message to a correspondent device allowing the correspondent device to send messages directly to the base station that the mobile device is operably connected to, thereby bypassing a home agent of the mobile device.

7. The method of claim 6 wherein the correspondent device comprises a bandwidth manager operable to allocate use of the communication resources of the wireless communication system.

8. The method of claim 6 wherein the binding message includes a care-of-address of the mobile device, the care-of-address being usable for sending messages to the mobile device while operably connected to the base station.

9. The method of claim 8 wherein the binding message further includes a home address of the mobile device, the home address being associated with a subnetwork to which a home agent of the mobile device is operably connected.

10. The method of claim 8 wherein the binding message further includes a base station identifier of the base station to which the mobile device is operably connected.

11. The method of claim 6 wherein the correspondent device comprises a call control entity operable to manage the provision of calls to devices of the wireless communication system.

12. In a wireless communication system including mobile device eligible to move between a plurality of base stations, and a binding proxy operable to detect when the mobile device operably connects to a base station of the plurality of base stations, a method comprising:
   sending, from the binding proxy to a call control entity, a first binding message including a care-of-address of the mobile device, the care-of-address being usable for sending messages to the mobile device while operably connected to the base station allowing the call control entity to send messages directly to the base station that the mobile device is operably connected to, thereby bypassing a home agent of the mobile device;
   sending, from the binding proxy to a bandwidth manager, a second binding message informing the bandwidth manager of the base station to which the mobile device is operably connected allowing the bandwidth manager to send messages directly to the base station that the mobile device is operably connected to, thereby bypassing a home agent of the mobile device.

13. The method of claim 12, further comprising:
   receiving, by the call control entity, a request to set up a call involving the mobile device;
   sending, by the call control entity to the bandwidth manager, a request to allocate a communication resource to the mobile device for the call;
   determining, by the bandwidth manager, an availability of resources at the base station to which the mobile device is operably connected to support the call; and
   sending, by the bandwidth manager to the call control entity, a notification of the availability of resources.

14. The method of claim 13, further comprising:
   if resources are available at the base station to which the mobile device is operably connected, sending, by the call control entity, a call setup message addressed to the care-of-address of the mobile device.

15. A wireless communication system comprising:
   a data network comprising a plurality of subnetworks;
   a correspondent device attached to the data network;
   a plurality of base stations attached to the data network, the base stations being operable to provide communication service to a mobile device using communication resources;
   a home agent of the mobile device, the home agent being attached to a home subnetwork of the plurality of subnetworks; and
   a binding proxy operable to detect a first binding message sent from the mobile device to the home agent over the data network, and send a second binding message to the correspondent device, allowing the correspondent device to send messages directly to the subnetwork that the mobile device is connected to, thereby bypassing the home agent.

16. The wireless communication system of claim 15 wherein the correspondent device is a bandwidth manager operable to manage the communication resources.

17. The wireless communication system of claim 16 wherein the second binding message includes a base station identifier of the base station to which the mobile device is operably connected.

18. The method of claim 1 wherein the second binding message includes a base station identifier identifying a base station to which the mobile device is operably connected.

* * * * *